US006884373B1

(12) United States Patent
Johnson et al.

(10) Patent No.: US 6,884,373 B1
(45) Date of Patent: *Apr. 26, 2005

(54) PROCESS FOR SECURING A BRANCH ASSEMBLY TO A PIPELINE

(75) Inventors: Leigh Martin Johnson, Bonsall (GB); Christopher Hughes, Loughborough (GB); Dan Quoc Vu, Loughborough (GB)

(73) Assignee: Lattice Intellectual Property Limited, London (GB)

(*) Notice: Subject to any disclaimer, the term of this patent is extended or adjusted under 35 U.S.C. 154(b) by 432 days.

This patent is subject to a terminal disclaimer.

(21) Appl. No.: 10/030,119

(22) PCT Filed: Jul. 19, 2000

(86) PCT No.: PCT/GB00/02705

§ 371 (c)(1),
(2), (4) Date: May 13, 2002

(87) PCT Pub. No.: WO01/07820

PCT Pub. Date: Feb. 1, 2001

(30) Foreign Application Priority Data

Jul. 24, 1999 (GB) ............................................. 9917360
Apr. 28, 2000 (GB) ............................................. 0010328

(51) Int. Cl.⁷ ........................... B29C 73/00; F16L 55/16
(52) U.S. Cl. ............................. 264/32; 138/99; 264/35; 264/36.16; 264/36.22; 264/262

(58) Field of Search ......................... 264/32, 35, 36.16, 264/36.22, 262; 138/99

(56) References Cited

U.S. PATENT DOCUMENTS

| | | |
|---|---|---|
| 3,292,954 A | 12/1966 | Corey |
| 4,050,720 A | 9/1977 | Reneau |
| 5,842,496 A | 12/1998 | Delanty et al. |
| 5,918,639 A | 7/1999 | Ottestad et al. |
| 6,612,341 B1 * | 9/2003 | Vu .............................. 138/99 |

* cited by examiner

Primary Examiner—Leo B. Tentoni
(74) Attorney, Agent, or Firm—Oblon, Spivak, McClelland, Maier & Neustadt, P.C.

(57) ABSTRACT

A method for securing a branch assembly to a "live" pipeline. An upper part of the assembly incorporating the branch is positioned on the pipeline over a containment ring located on the pipeline and within which is an annular seal surrounding an area from which the branch is to extend. A lower part of the assembly is positioned on the pipeline beneath the upper part and the two parts are secured together so that the seal is compressed and an annular space is left between the two parts and the external surface of the pipeline. Grout is injected into the annular space and cures to bond the two parts forming the branch assembly in position on the pipeline. The use of grout avoids having to use welding techniques on a "live" pipeline. A coupon can be cut out of the pipeline, via the access through the branch.

15 Claims, 5 Drawing Sheets

1

PROCESS FOR SECURING A BRANCH ASSEMBLY TO A PIPELINE

BACKGROUND OF THE INVENTION (1) Field of the Invention

The present invention relates to tee or branch connections to a pipeline and, more particularly, to a method of connecting tee or branch assemblies to pipelines such as gas or water mains.

(2) Description of Related Art

An existing technique for repairing damaged steel pipelines uses basically two half-shells which are secured together to form a shell assembly which encircles the pipeline leaving an annulus between the pipeline and the shell assembly which is filled with grout that bonds the shell assembly to the pipeline wall. The epoxy grout thus fills and surrounds the damaged region and supports the damaged pipeline wall.

BRIEF SUMMARY OF THE INVENTION

An object of the present invention is to provide a method of securing tee or branch connections to pipelines.

According to the invention, a method is provided for securing a branch assembly to a pipeline, wherein the branch assembly comprises a first part for locating on the side of the pipeline remote from the side from which the branch is to extend, and a second part incorporating the branch, the method comprising positioning a containment ring on the pipeline at the required position on the pipeline and surrounding the area from which the branch is to extend, positioning an annular seal on the pipeline so that the seal is wholly radially within the containment ring, positioning the second part of the branch assembly onto the seal, positioning the first part of the assembly on the pipeline and securing the first and second parts together so as to compress the seal and leave an annular space between the first and second parts and the external surface of the pipeline, providing sealing means for substantially preventing grout from escaping from the annular space, and introducing into the annular space grout that cures to bond the branch assembly in position on the pipeline.

It will be appreciated that subsequent to the branch assembly becoming bonded to the pipeline, a known procedure can be executed for cutting a coupon out of the pipeline via access through the branch under "live" conditions of the pipeline.

It will also be appreciated that the annular seal must be sufficiently compressible, and also sufficiently robust to withstand and contain with the containment ring line pressure during operation of the pipeline over the working pressures.

The grout may, for example, be selected from the following range:

urethanes, polyesters, acrylics, epoxies and cemtatious compounds. It will be appreciated that each should be selected to satisfy the operating temperature, humidity and curing rate which then leads to the different adhesion strengths for different applications. Different grout material provides a different exothermic reaction which will determine the volume change after installation. It will also be understood that the volume change of epoxy grout should be optimized to minimize the internal stress system within the grout.

In order to ensure there is a good key for the grout, the external surface of pipeline and the inner surface of the first and second parts of the branch assembly may be dressed up or grit blasted prior to the assembly being mounted on the pipeline.

Conveniently, jacking means are employed to space the first part from the pipeline when the first and second parts have been secured together on the pipeline.

The jacking means may be hydraulically operated. For example, the jacking means may comprise a plurality of jacking members slidably mounted in apertures in the first part and pressure-applying means mounted with respect to the first part and behind the jacking members and being urgable under hydraulic pressure against the jacking members to cause the jacking members to be urged towards the pipeline to positions to space the first part from the pipeline.

Conveniently, the jacking members are slidably mounted in bosses or the like secured or fixed to the first part, in which case the pressure-applying members are also slidably mounted in the bosses or the like.

When the jacking members are in position spacing the first part from the pipeline, stop means are fixed in position with respect to the first part to prevent the jacking members moving away from the pipeline.

Advantageously, the pressure-applying means are removably mounted with respect to the first part, and the stop means are adapted to occupy the positions occupied by the pressure-applying means when the latter are removed.

The stop means may be screwed into position in threaded supporting members fixed to the first part.

Conveniently, one or more load bearing members are positioned between the pipeline and the jacking members to spread the applied load when the jacking members are in position spacing the first part from the pipeline.

The load bearing members may be in the form of enlarged feet on the jacking members, the surfaces of which feet may generally correspond to the profile of the pipeline. Alternatively, the load bearing members may be secured to the pipeline, in positions so that they will be engaged or contacted by the jacking members.

BRIEF DESCRIPTION OF THE DRAWINGS

The invention will now be described, by way of example only, with reference to the accompanying drawings, in which.

DETAILED DESCRIPTION OF THE INVENTION

Figure 1:
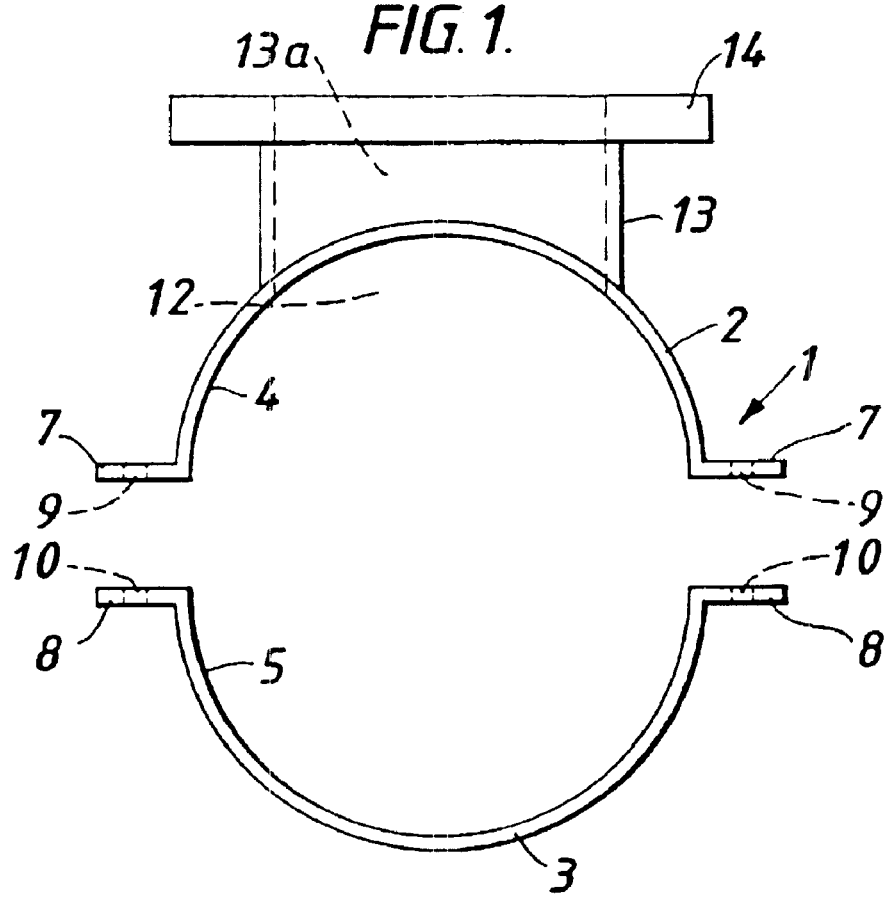
FIG. 1 shows schematically the top and bottom parts of a branch assembly to be used in a method according to the invention.

With reference to FIG. 1, there is shown a branch assembly 1 comprising a first part 2 forming the upper part of the assembly and a second part 3 forming the lower part.

Figure 3:
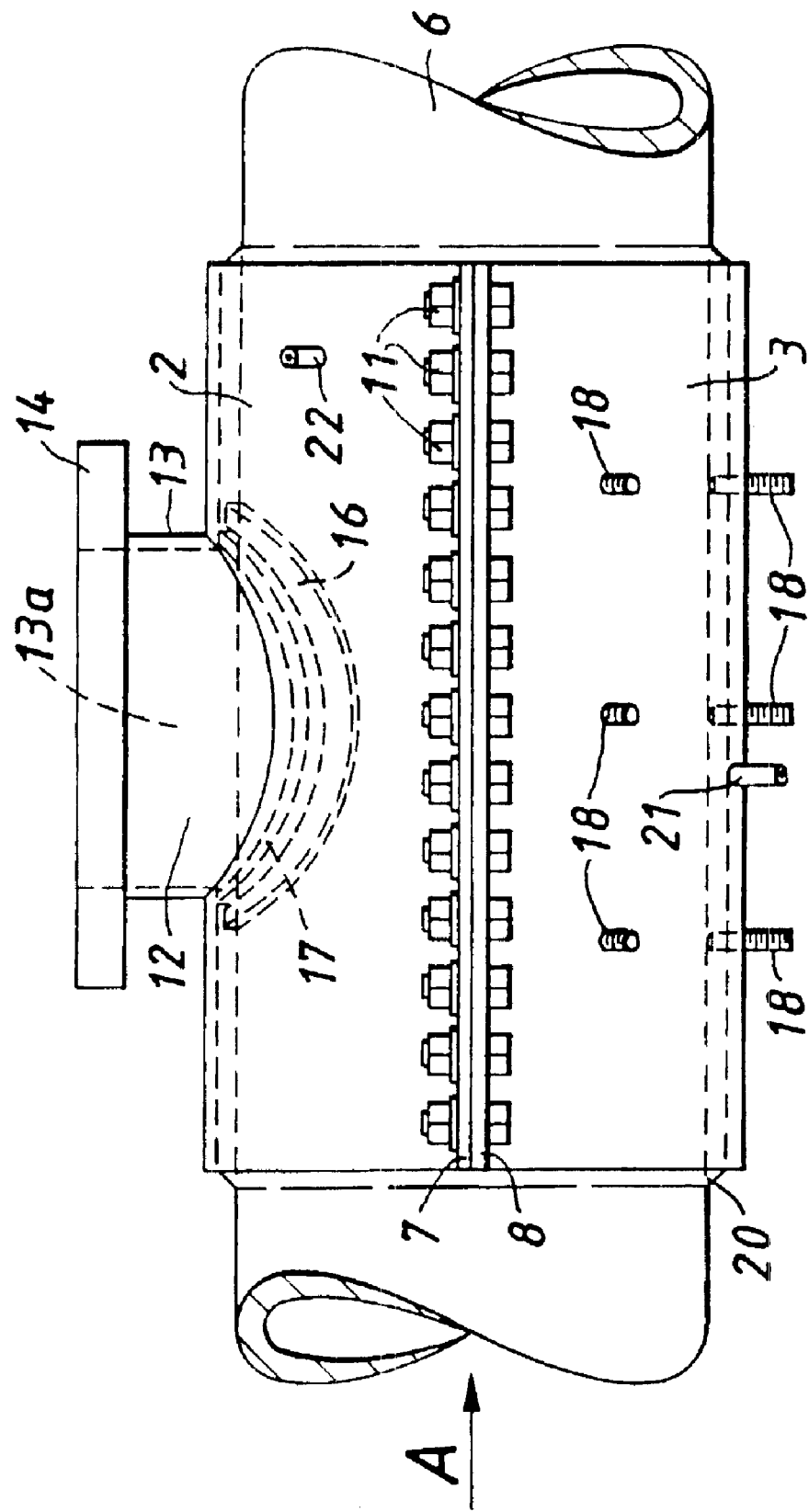
FIG. 3 is a schematic side view of the pipeline on which the top and bottom parts of the branch asssembly have been secured together in position.

The upper part and lower parts of the assembly 1 are made of carbon steel and have generally part cylindrical portions 4 and 5, respectively, which are securable together about a pipeline 6 via flanges 7 and 8 which extend longitudinally along each side of the upper and lower parts, as can be clearly seen in FIG. 3.

The flanges 7 of the upper part 2 have apertures 9 which are intended to align with apertures 10 in the flanges 8 of the lower part 3 so that securing bolts 11 (see FIGS. 3 and 4) can be passed therethrough to secure the two parts 2 and 32 together on the pipeline.

The upper cylindrical portion 4 includes an apertured section 12 from which extends a short branch pipe 13 terminating in an annular flange 14 to which a branch pipeline having an end flange can be connected in a known fashion (not shown) after the assembly 1 is securely bonded to the pipeline 6.

By way of illustration of the invention, a method of securing the tee assembly 1 to a steel pipeline is described below.

Initially, the area of the external surface of the pipeline to which the branch assembly is to be secured is grit blasted (not shown), as are the inner surfaces of the part-cylindrical portions 4 and 5 of the upper and lower parts of the branch assembly.

A containment ring 16 made of steel and shaped so as to conform to the shape of the pipeline is positioned on the pipeline around the area 6a from which the branch pipe 13 of the branch is to extend.

Figure 2:
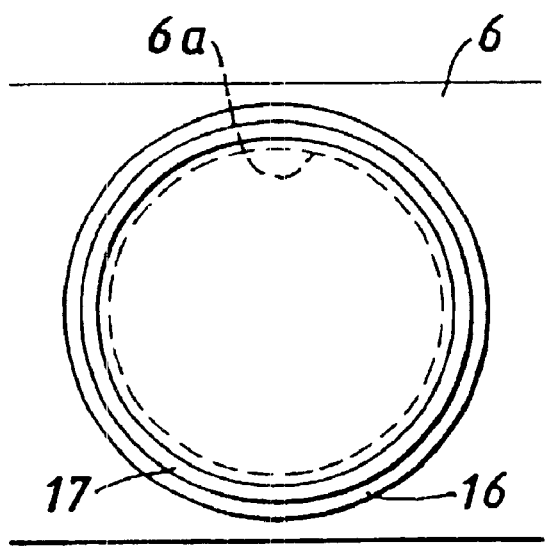
FIG. 2 is a schematic plan view of a pipeline on which is positioned a containment ring and an annular sealing ring in preparation of the pipeline receiving the top part of the branch assembly.

An annular seal 17 made for example of rubber or polymer and metal and of greater thickness than the containment ring 16 is then placed within the containment ring so as substantially to conform to the shape of the pipeline 6 (see FIG. 2).

Figure 4:
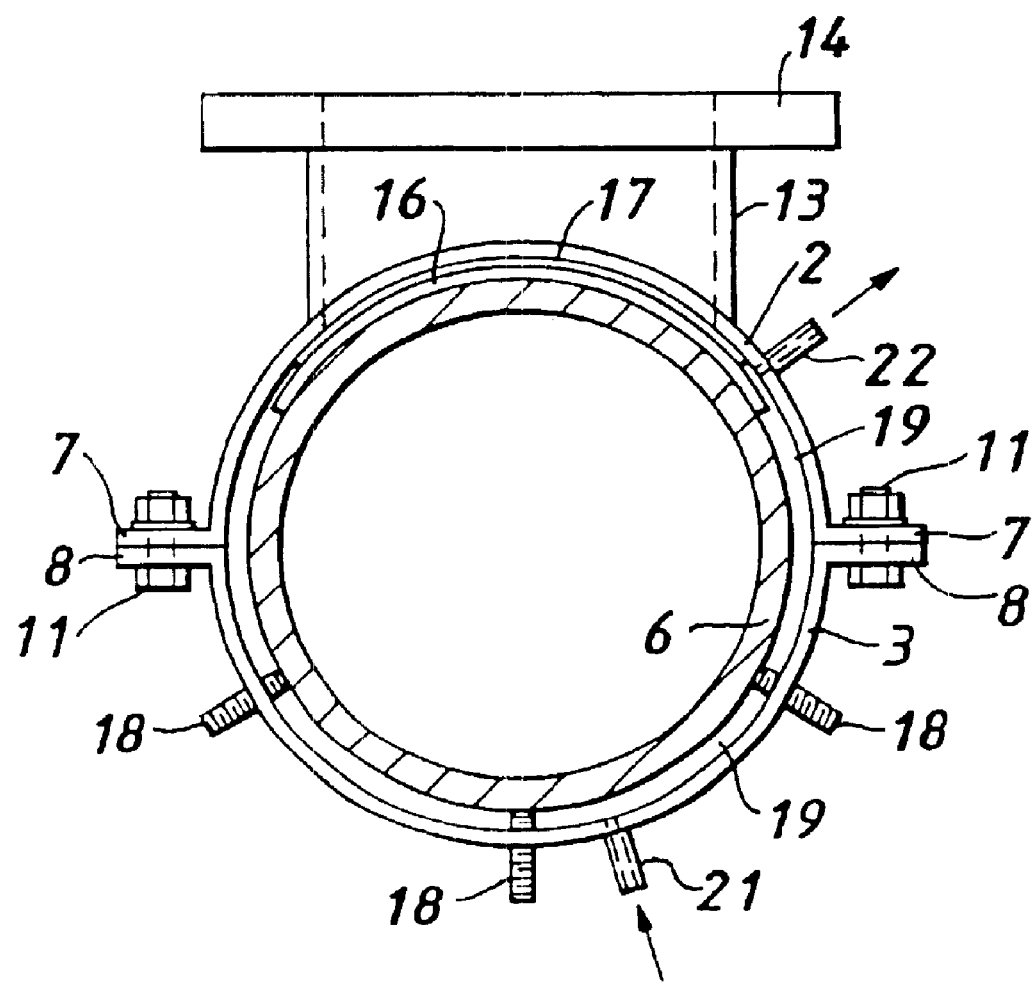
FIG. 4 is a schematic view in the direction of arrow A in FIG. 3.

The upper part 2 of the branch assembly is lowered onto the seal 17, with the bore 13a of the branch pipe 13 being centralised with the area 6a surrounded by the seal and containment ring, the lower part 3 is moved into position on the pipeline, and the upper and lower parts 2 and 3 of the assembly are secured together by means of bolts 11 used in association with the aligned apertures 9 and 10 in the flanges 7 and 8 (see FIGS. 3 and 4).

Jacking bolts 18 are mounted in the wall of the lower part 3 of the branch assembly. These jacking bolts extend through the wall of the lower part to engage or bear on the surface of the pipeline 6, and can be turned from the outside of the assembly to be loosened or tightened against the wall of the pipeline. The jacking bolts 18 are adjusted so that the annular seal 17 is sufficiently compressed to provide a suitable seal prior to the introduction of epoxy grout.

Once the tee assembly 1 is in position on the pipeline, a generally cylindrical or annular space or gap 19 is left or defined between the upper and lower parts 2 and 3 and the external surface of the pipeline 6.

The annular space is bounded by sealing means 20, such as suitable putty which is located between the branch assembly and the pipeline at the opposite ends of the assembly, and by the annular seal 17.

The grout is then injected into the annular space 19 via injection opening 21, located towards the bottom of the lower part of the assembly, to fill the annular space. An outlet opening 22 for expressed air and excess injected grout is provided in the upper part of the assembly. After the annular space 19 is filled with grout, the grout is allowed to cure and thereby bond the upper and lower parts 2 and 3, and thus the branch assembly 1, to the pipeline.

When the assembly is securely bonded by the grout to the pipeline, the jacking bolts 18 can be, optionally, loosened off to ensure load is fairly or more evenly distributed on the pipeline by the grout.

Figure 5:
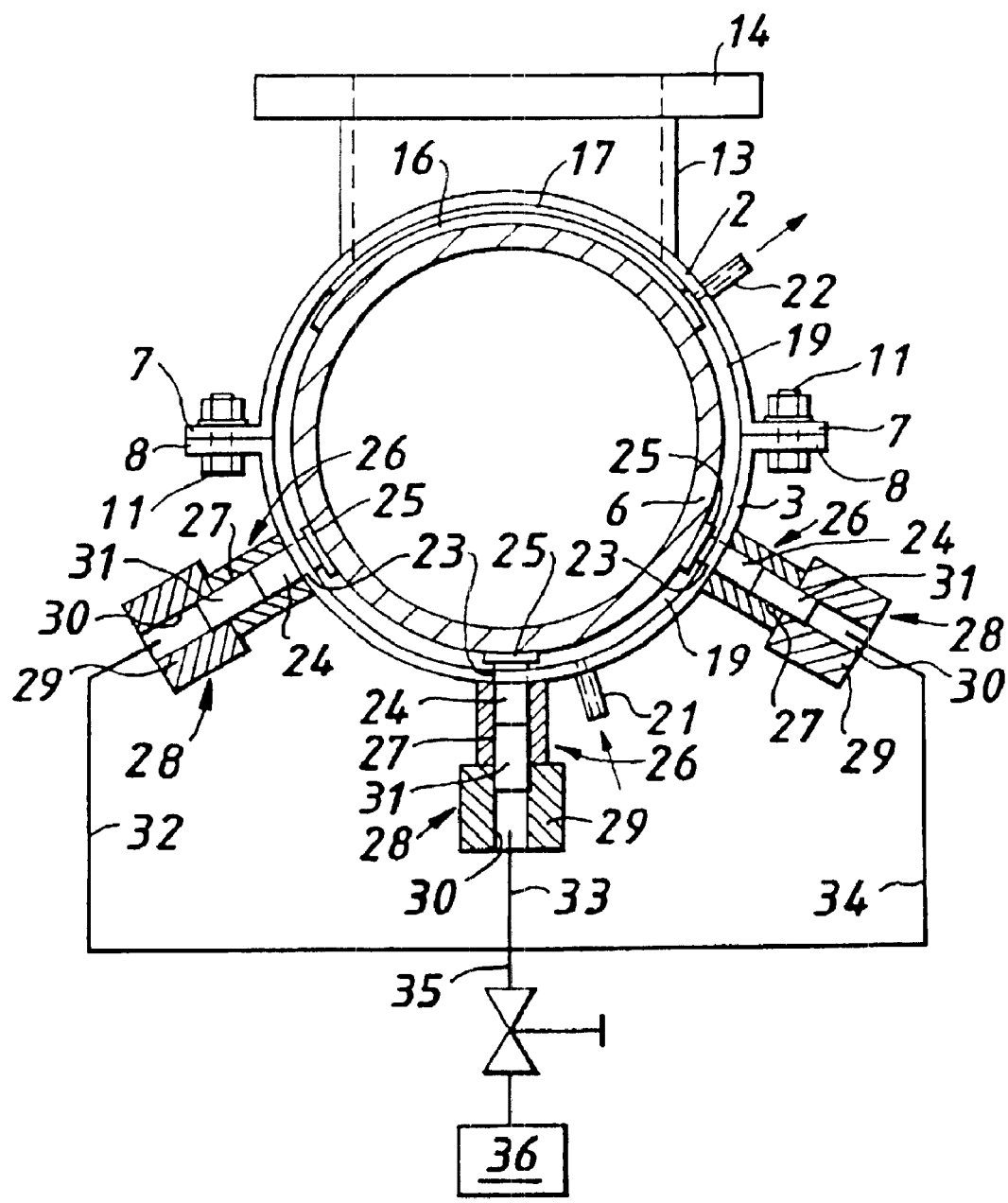
FIG. 5 is a similar view to that shown in FIG. 4 but of a modified arrangement in which the jacking means is hydraulically operated.
Figure 6:
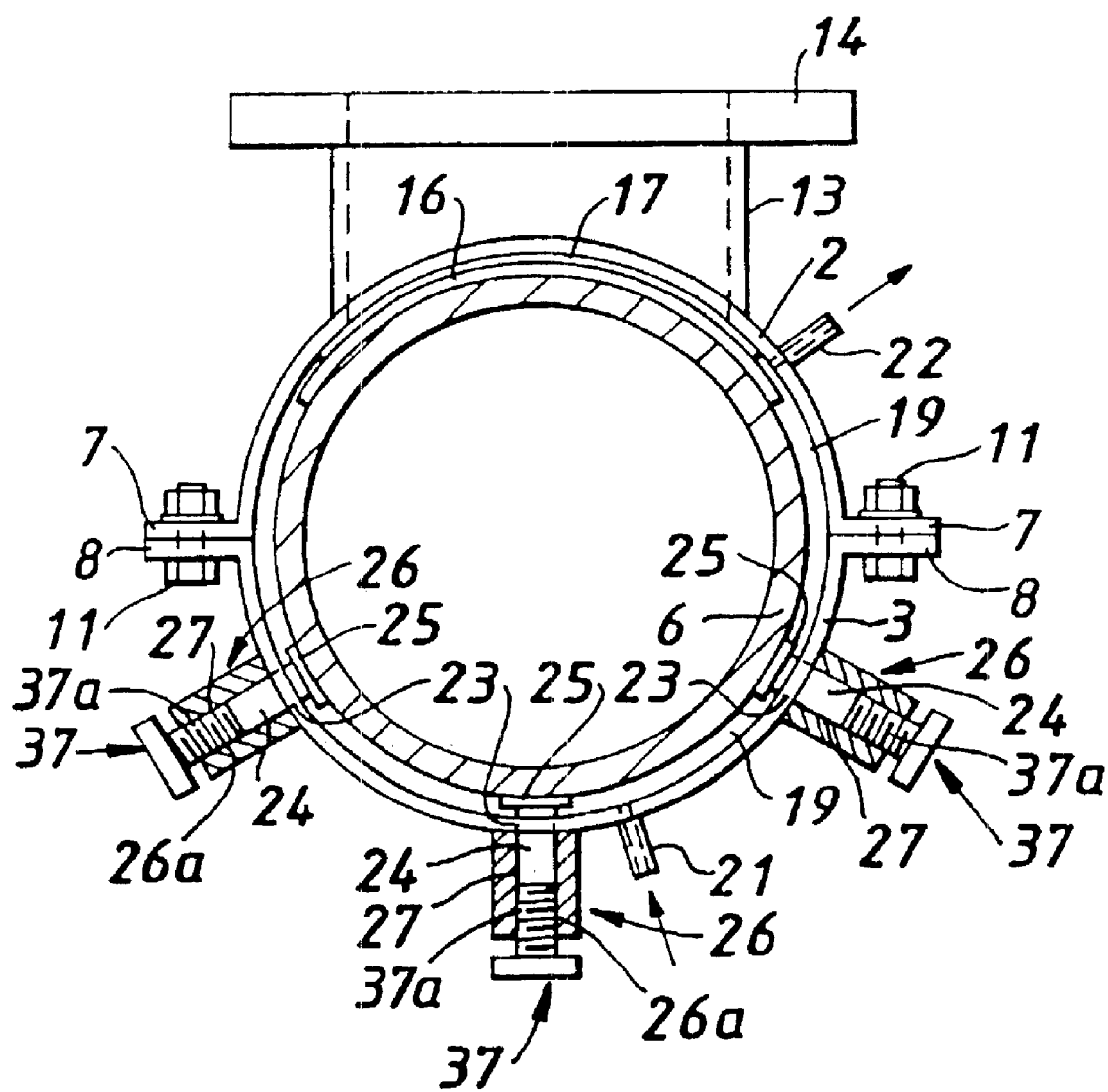
FIG. 6 is a view similar to FIG. 5 but showing stop means occupying the positions previously occupied by the pressure-applying means, as in FIG. 5.

In FIGS. 5 and 6 an alternative method of jacking is illustrated. The lower part 3 is provided with apertures 23 in which are slidably mounted jacking members 24 each carrying enlarged feet 25 which match the profile of the pipeline and are for engaging or contacting the surface of the pipeline. Bosses 26 having through bores 27 are secured to the lower part 3. The through bores 27 are for slidably receiving the free, outer ends of the jacking members 24. Hydraulically operated means 28 comprising cylinder means 29 are mounted on the bosses 26. Each cylinder means 29 comprises a cylinder 30 and a pressure-applying means 31 in the form of a piston is slidably mounted in the cylinder 30. The cylinders 30 are aligned with respective ones of the bores 27 of the bosses 26. The pistons are also slidably mounted in the bores 27 of the bosses 26. Hydraulic pressure is applied through lines 32, 33, 34 to the respective cylinders 30 from a common main line 35 to a source 36 of hydraulic pressure. On applying appropriate hydraulic pressure to the cylinders 30 the pistons 3 are urged against the jacking members 24 to cause the jacking members to be urged towards and against the pipeline 6 such that the annular seal 17 is compressed and a generally annular space or gap 19 is formed as described earlier.

The enlarged feet 25 serve as load bearing members that spread the load applied to the pipeline via the jacking members.

After the grout has been injected into the annular space 19 and allowed to cure, as described above, the cylinder means 29, including the pistons, are removed from the bosses 26 and stops 37 (see FIG. 6) are inserted into the bosses and fixed in position therein butting up against the back ends of the jacking members, thereby occuping the positions previously occupied by the pistons, to prevent the jacking members moving away from the pipeline. The stops 37 may be externally threaded as at 37a and screwed into bosses 26 which are correspondingly internally threaded as at 26a. The provision of the fixed stops 37 removes reliance on the continued integrity of the cured grout behind the enlarged feet to prevent unwanted movement of the jacking members 24 away from the pipeline. Thus, if the cured grout behind the enlarged feet 25 should deteriorate and disintegrate or "fail", the stops 37 hold the pipeline in position relative to the shell assembly.

In a modification (not shown) the enlarged feet on the jacking members may be replaced by load bearing members secured to the pipeline in positions so that they will be engaged or contacted by the jacking members.

With the branch assembly securely bonded to the pipeline, known "live" procedures can be performed for cutting out a coupon from area 6a of the pipeline (not shown) and joining a branch pipeline (not shown) to the branch utilising the branch pipe 13. Such known procedures will not be described here.

A method according to the invention, examples of which are described above, enables a branch assembly to be bonded to a pipeline without having to employ welding techniques. This is a particular advantage where "live" pipelines are involved, especially where there are high product flow rates through the pipeline. Other advantages of using such a method include minimising unnecessary pressure reduction in the pipeline and enabling cost savings for installations.

What is claimed is:

1. A method for securing a branch assembly to a pipeline, wherein the branch assembly comprises a first part for locating on the side of the pipeline remote from the side from which the branch is to extend, and a second part incorporating the branch, the method comprising:

positioning a containment ring on the pipeline at the required position on the pipeline and surrounding the area from which the branch is to extend;

positioning an annular seal on the pipeline so that the seal is wholly radially within the containment;

positioning the second part of the branch assembly onto the seal;

positioning the first part of the assembly on the pipe line and securing the first and second parts together so as to compress the seal and leave an annular space between the first and second parts and the external surface of the pipeline; and providing sealing means for substantially preventing grout from escaping from the annular space, and introducing into the annular space grout that cures to bond the branch assembly in position on the pipeline.

2. A method as claimed in claim 1, wherein the first part forms the lower part of the assembly and the second part forms the upper part of the assembly.

3. A method as claimed in claim 1, wherein the annular seal is made of rubber or of a polymer and metal composite.

4. A method as claimed in claim 1, wherein the grout is injected into the annular space between the first and second parts and the external surface of the pipeline.

5. A method as in claim 1, wherein jacking means are employed to space the first part from the pipeline when the first and second parts have been secured together on the pipeline.

6. A method as in claim 5, in which and the jacking means is hydraulically operated.

7. A method as in claim 6, in which the jacking means comprises a plurality of jacking members slidably mounted in apertures in the first part an pressure-applying means mounted with respect to the first part and behind the jacking members and being urgable under hydraulic pressure against the jacking members to cause the jacking members to be urged towards the pipeline to positions to space the first part form the pipeline.

8. A method as claimed in claim 7, in which the jacking members are slidably mounted in bosses secured or fixed to the first part, and the pressure-applying members are also slidably mounted in the bosses.

9. A method as claimed in claim 7, in which when the jacking members are in position spacing the first part from the pipeline, stop means are fixed in position with respect to the first part to prevent the jacking members moving away from the pipeline.

10. A method as claimed in claim 7, in which the pressure-applying means are removably mounted with respect to the first part, and the stop means are adapted to occupy the positions occupied by the pressure-applying means when the latter are removed.

11. A method as claimed in claim 10, in which the stop means are screwed into position in threaded supporting members fixed to the first part.

12. A method as claimed in claim 7, in which one or more load bearing members are positioned between the pipeline and the jacking members to spread the applied load when the jacking members are in position spacing the first part from the pipeline.

13. A method as claimed in claim 12, in which the load bearing members are in the form of enlarged feet on the jacking members.

14. A method as claimed in claim 13, in which the surfaces of the feet generally correspond to the profile of the pipeline.

15. A method as claimed in claim 12, in which the load bearing members are secured to the pipeline in positions so that they will be engaged or contacted by the jacking members.

* * * * *